Oct. 21, 1969  A. S. IVESTER  3,473,452
EXPOSURE VALUE DETERMINING SYSTEM FOR PHOTOGRAPHIC APPARATUS
Filed Sept. 16, 1966  4 Sheets-Sheet 2

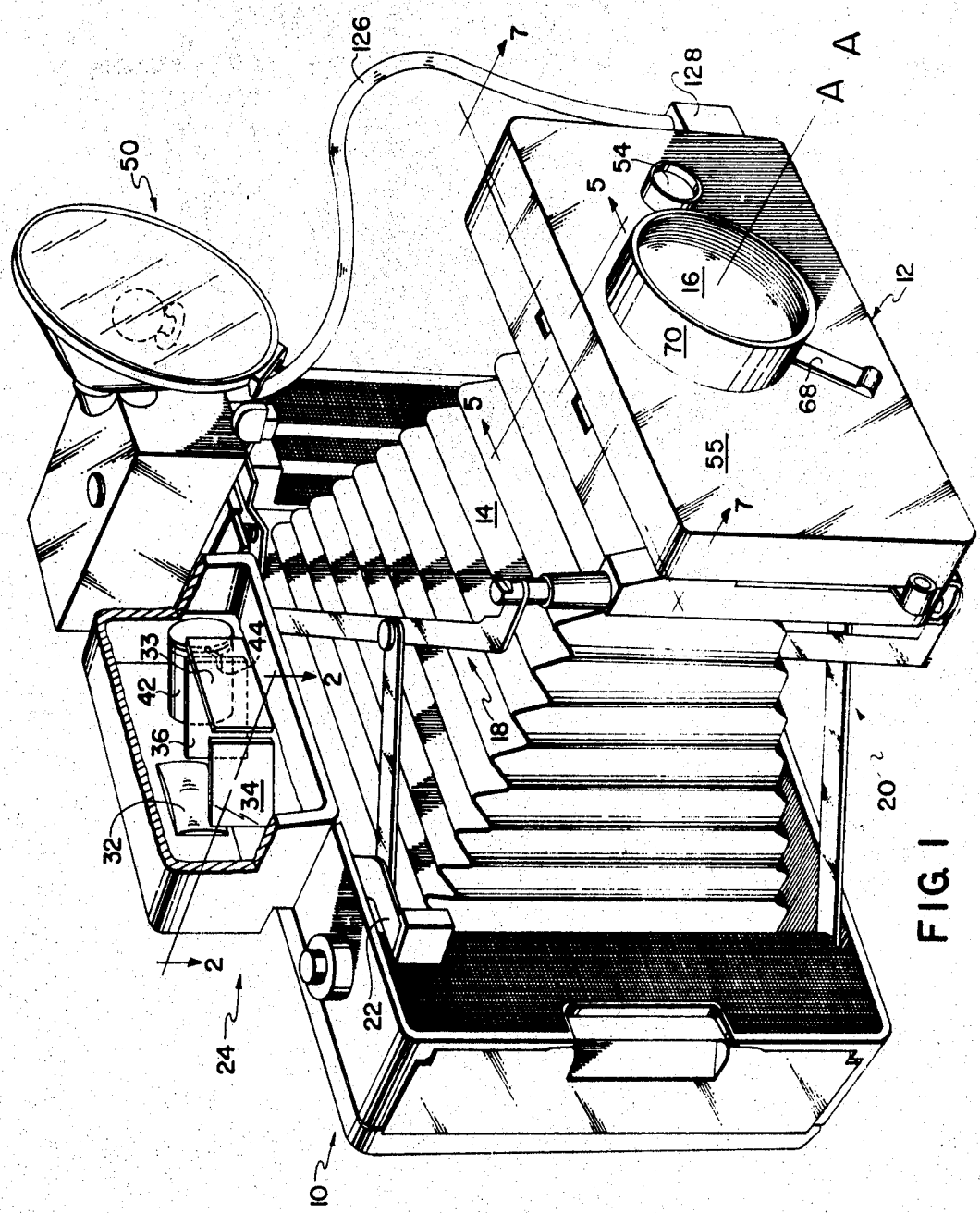

INVENTOR.
Andrew S. Ivester
BY
Brown and Mikulka
and
John H. Coult
ATTORNEYS

Oct. 21, 1969 A. S. IVESTER 3,473,452
EXPOSURE VALUE DETERMINING SYSTEM FOR PHOTOGRAPHIC APPARATUS
Filed Sept. 16, 1966 4 Sheets-Sheet 4

INVENTOR.
Andrew S. Ivester
BY
Brown and Mikulka
and
John H. Coult
ATTORNEYS

United States Patent Office 3,473,452
Patented Oct. 21, 1969

3,473,452
EXPOSURE VALUE DETERMINING SYSTEM FOR PHOTOGRAPHIC APPARATUS
Andrew S. Ivester, Cambridge, Mass., assignor to Polaroid Corporation, Cambridge, Mass., a corporation of Delaware
Filed Sept. 16, 1966, Ser. No. 579,884
Int. Cl. G03b 9/70; G01j 1/42
U.S. Cl. 95—10                      4 Claims

ABSTRACT OF THE DISCLOSURE

A photographic camera includes an exposure value determining system operable according to a flash mode and an ambient mode. In the flash mode the exposure value is determined in accordance with camera focus adjustment and another factor. In the ambient mode exposure value is determined in accordance with ambient lighting conditions and the other factor.

---

This inveniton relates to photographic apparatus, and more particularly to an exposure value determining system for use in a photographic camera in both flash and ambient lighting conditions.

Some photographic cameras of the hand-held type incorporate an exposure value determining system including an exposure meter of the photoelectric type combined with a viewfinder for the camera. Such photometer-viewfinder combinations are particularly convenient to operate and considerably enhance the speed with which such cameras may be operated in ambient lighting conditions.

However, of course, due to their photometric nature, such devices are not useful for ascertaining proper exposure values in low level ambient lighting conditions wherein flash illumination is necessary. Many of the cameras embodying such devices incorporate a distance scale of estimated camera-to-subject distances for determining an appropriate effective exposure aperture or shutter speed in flash applications. It has been found to be quite difficult, however, for many individuals to estimate camera-to-subject distances with a tolerable degree of accuracy.

This invention contemplates the provision in a camera having a light measuring and indicating device of means which cooperates with the device to aid in the selection of proper exposure values not only in an ambient lighting mode of operation but also in a flash lighting mode, and which means requires no visual estimation of camera-to-subject distances.

Accordingly, it is an object of this invention to provide in a photographic camera an exposure value determining system which is effective to aid in the selection of proper exposure values in both ambient and flash lighting modes of operation.

It is another object of this invention to provide in a variable focus camera an exposure value determining system including light measuring and indicating means responsive to ambient brightness and to variable resistance means the effective resistance of which is varied in accordance with focus adjustments, the indicating means being rendered responsive to the photoresponsive means in an ambient lighting mode and to focus adjustments in a flash lighting mode for determining proper exposure values in both modes.

It is a further object of this invention to provide in a variable focus camera an exposure value determining system for aiding a user in the selection of proper exposure values for flash exposures which is accurate and requires no visual estimation of subject distances, and which is simple in structure and operation.

It is still another object of this invention to provide in a variable focus camera having exposure control means, light measuring and indicating means yielding a unique indication in both ambient and flash lighting modes of operaton that an exposure value within a narrow range of appropriate values has been selected with the exposure control means.

It is still a further object of this invention to provide in a variable focus camera an exposure value determining system comprising photometric means including indicating means which is responsive in an ambient lighting mode of operation to a first resistance means the magnitude of the resistance of which is dependent upon the intensity of ambient light and responsive in a flash lighting mode of operation to second resistance means the magnitude of the resistance of which is dependent upon the setting of focusing means for the camera. It is yet another object to provide in such a system third resistance means connectable to the second resistance means in the flash lighting mode, the magnitude of the resistance of third resistance means being varied in accordance with adjustments in exposure control apparatus for the camera such that at a unique indication by the indicating means in either the ambient or flash lighting modes the exposure control apparatus is effective to establish an appropriate exposure value.

Other objects of this invention will in part be obvious and will in part appear hereinafter.

The invention accordingly comprises the apparatus possessing the construction, combination of elements and arrangement of parts which are exemplified in the following detailed disclosure and the scope of the application of which is indicated in the claims.

For a fuller understanding of the nature and objects of the invention, reference should be had to the following detailed description taken in connection with the accompanying drawings wherein:

FIGURE 1 is a perspective view of a photographic camera embodying apparatus which may be constructed in accordance with the principles of the invention;

Figure 3:
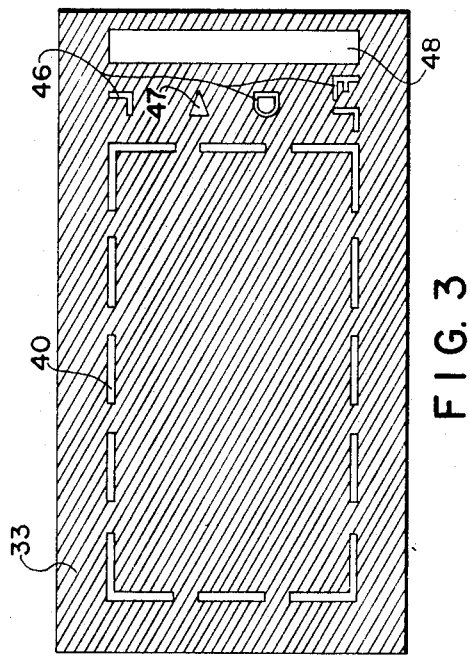
FIG. 3 is a side view of a mask comprising an element of the apparatus illustrated in FIGS. 1 and 2.
Figure 2:
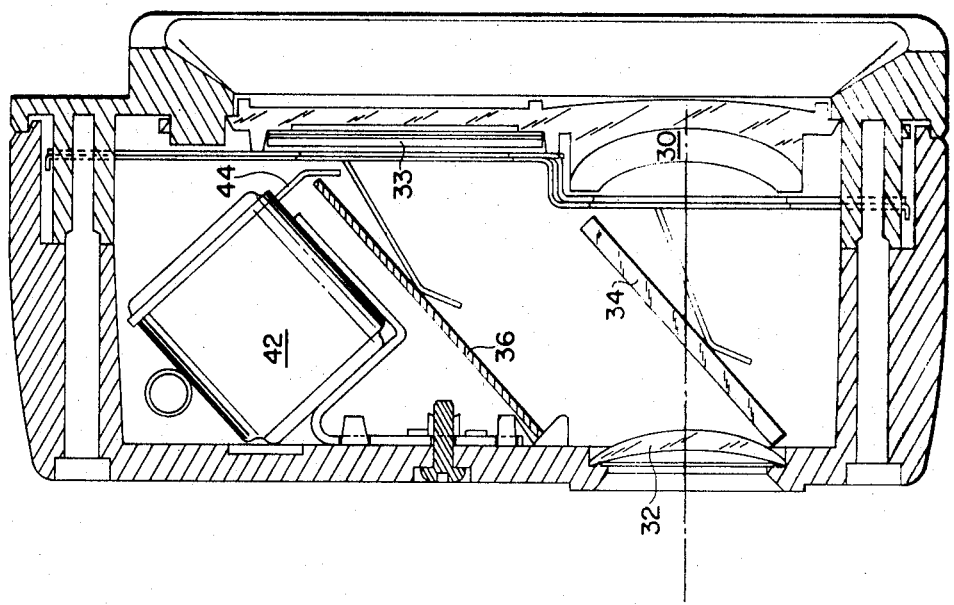
FIGURE 2 is a section view taken on lines 2—2 of FIGURE 1.

One possible structural implementation of the inventive concepts is illustrated in the drawings. Although the invention is shown as being embodied in a particular camera, it will be readily appreciated by those skilled in the art that the invention may be practiced to equal advantage in many other photographic structures. Referring particularly to FIGURE 1, a camera is shown as having a back assembly 10, a front assembly 12, and a bellows 14 interconnecting the back and front assemblies 10 and 12.

The camera incorporates an optical system including an objective lens 16 in the front assembly 12 for focusing the images of photographic subjects upon an image plane within the back assembly 10 of the camera. The front assembly 12 may be moved along the optical axis A—A to effect focus adjustments of lens 16 by means of upper and lower focusing linkages 18, 20. A focus adjustment member 22 is operable by the forefingers of the operator to effect selective translation of the front assembly 12.

In one embodiment of the invention, illustrated in FIGS. 1–7 a viewfinder assembly 24 may be provided as shown, being mounted upon the back assembly 10 of the camera. Referring especially to the sectional view through the viewfinder assembly 24 in FIG. 2 and the broken away portion of the viewfinder assembly 24 in FIGURE 1, a Galilean-type viewfinder optical system will be seen, comprising a negative front lens element 30 and an eyepiece 32.

Optical means may be provided for imposing the image of a mask 33 upon the field of view presented by the viewfinder. FIG. 3 shows the mask 33 as it would appear looking into the viewfinder assembly 24 from the world. The optical means preferably comprises a semi-reflective mirror 34 angled across the optical axis of the viewfinder and a fully reflective mirror 36 parallel thereto for reflecting the image of mask 33 upon mirror 34. The mask 33 may comprise an opaque plate having light-transmissible areas 40 formed therein for delimiting approximately the portion of the field of view which will be recorded on photosensitive material at the image plane of lens 16 within the camera.

In order to provide indications of the selection of appropriate exposure values, a galvanometer 42 may be provided. The combination of a galvanometer with such a viewfinder is described and claimed in a copending application of Milton S. Dietz, Ser. No. 564,950, filed July 13, 1966 and assigned to the assignee of the present invention. Briefly, the galvanometer 42 may be disposed behind the fully reflective mirror 36 with pointer 44 on the galvanometer 42 traveling generally in a plane between the mask 33 and a marginal portion of the fully reflective mirror 36. The mask 33 may be provided with light-transmissible areas 46 for defining an exposure trim scale and means for indicating (for example by the letters "FL") ambient light levels too low for a satisfactory exposure. A light transmissible fiducial mark 47 may be formed in mask 33 to serve as a reference indication. A light transmissible window 48 may be provided in the mask 33 in order that a silhouette image of the pointer 44 may be imposed on the field of view adjacent the light transmissible areas 46. With the described arrangement of mask 33 and galvanometer 42 connected to a photoresponsive element exposed to scene light, as described below, the operator is able to obtain ambient light level indications while viewing the scene to be photographed.

By this invention, means are provided whereby a galvanometer and a cooperating trim scale may be utilized to yield exposure information not only in the ambient lighting mode of operation wherein exposures are made in ambient illumination but also in the flash lighting mode wherein flash apparatus is employed to provide the necessary illumination for exposure. Exemplary flash apparatus which may be used is illustrated at 50 in FIGURE 1.

Figure 6:
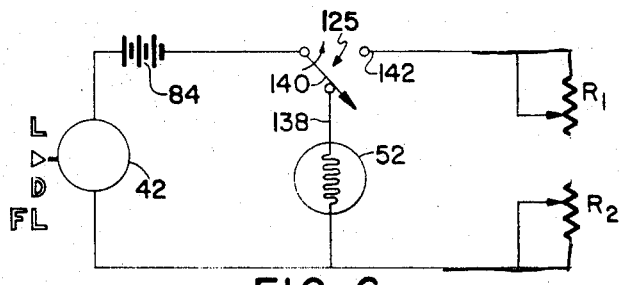
FIG. 6 illustrates a circuit diagram which may be constructed in accordance with the invention.

In the ambient lighting mode, the galvanometer 42 is connected in series with a photoconductive cell 52, as shown in FIG. 6. The cell 52 is exposed to the scene through a window 54 (see FIGURE 1) in the front wall 55 of the front assembly 12. With this photometric arrangement the galvanometer pointer 44 is deflected through an angular displacement which depends on the level of scene brightness.

Figure 4:
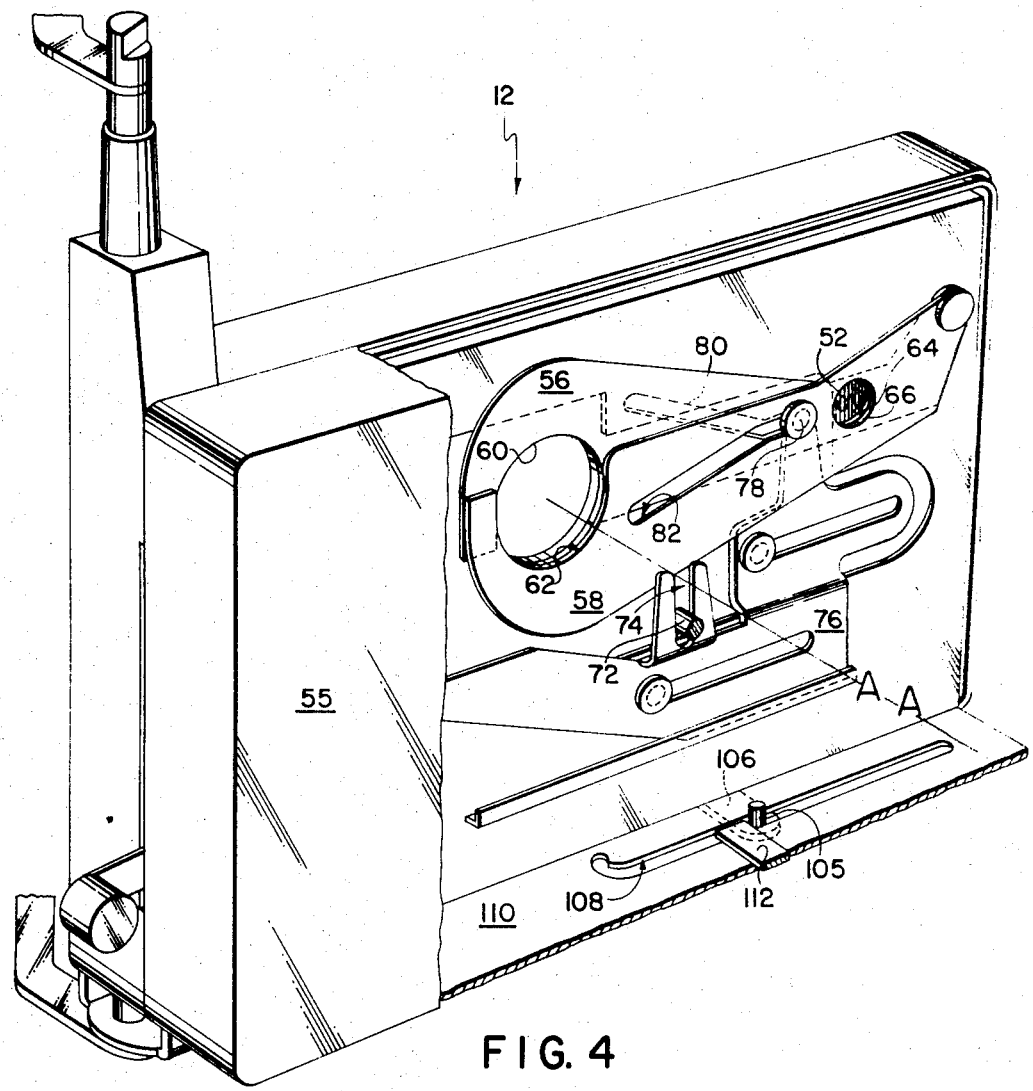
FIG. 4 is a perspective view of the front assembly of the camera illustrated in FIGURE 1, a portion thereof being broken away to illustrate certain hidden elements contained therein.

Thus the deflection of the pointer 44 might be used to indicate an exposure value appropriate for the scene brightness. However, in order to eliminate the intermediate step of obtaining an exposure value and then by another operation translating this value into a setting of exposure control means, means are provided for directly coupling exposure control means directly to the photometric apparatus. To this end, as seen in FIG. 4, a set of diaphragm blades 56, 58 may be provided for defining the effective exposure aperture and for simultaneously controlling the amount of light admitted to the photoconductive cell 52. The blades 56, 58 are illustrated as having cooperating contours 60, 62 for defining the effective exposure aperture and cooperative contours 64, 66 for defining another aperture which controls the amount of light admitted to the cell 52.

Figure 5:
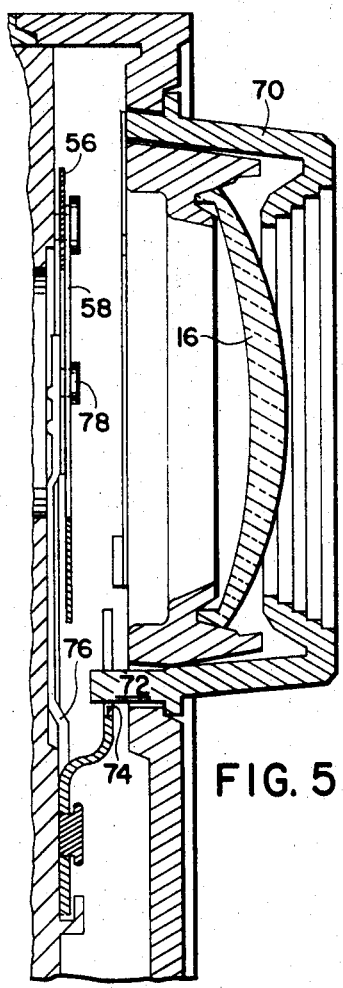
FIG. 5 is a sectional view taken along lines 5—5 in FIGURE 1.

Referring particularly to FIGS. 4 and 5, the angular displacement between the blades 56, 58 may be adjusted manually by rotating a radial lever 68 extending from a rotatable bezel 70 surrounding the objective lens 16. Rotation of the bezel 70 moves an inward extension 72 on the bezel 70 along an arcuate locus of travel. The extension 72 may be received in a slot 74 in a slide 76 in order that the arcuate movement of the extension 72 is translated into reciprocatory movement of a control member 78 on slide 76. The control member 78 is received in angularly displaced slots 80, 82 in diaphragm blades 56, 58. It is evident that upon rotation of the bezel 70 by means of lever 68, slide 76 is translated and control member 78 moves in slots 80, 82 to effect a change in the angular displacement between the disphragm blades 56, 58. Thus the size of the effective exposure aperture and the amount of light admitted to the photoconductive cell 52 is varied in accordance with the degree of rotation of the lever 68. Assuming a proper selection of the relative dimensions and geometry of the bezel 70, the blades 56, 58, and the slide 76, and a proper calibration of the other relevant parameters in the system, the diaphragm blades 56, 58 will define an effective exposure aperture which is appropriate for the level of scene brightness when the image of the galvanometer pointer 44 in the window 48 in mask 33 is directed toward the fiducial mark 47.

It is evident from the above description and the drawing that the galvanometer pointer 44 will be deflected into registration with the fiducial mark 47 to indicate the selection of an appropriate exposure value only when the effective resistance in the galvanometer circuit has a predetermined value. Referring to the galvanometer circuit diagram in FIG. 6, it will become evident, assuming negligible resistance in the battery 84 and the galvanometer coil, that the effective resistance of the circuit in the ambient lighting conditons is equal to the effective resistance of the photoconductive cell 52.

In accordance with the present invention, means are provided to enable the galvanometer and associated trim scale to be utilized in the flash lighting mode of operation as well as in the ambient lighting mode. To this end, a pair of variable resistors $R_1$, $R_2$ may be connected in series with the galvanometer 42 for determining an effective resistance controlling the current in the galvanometer 42 in the flash lighting mode. As will be more fully described below, the resistance of resistor $R_1$ is varied in accordance with the focus setting of the objective lens 16, as determined by the focusing linkages 18, 20. The resistance of resistor $R_2$ is caused to be varied in accordance with the setting of the diaphragm blades 56, 58.

Figure 7:
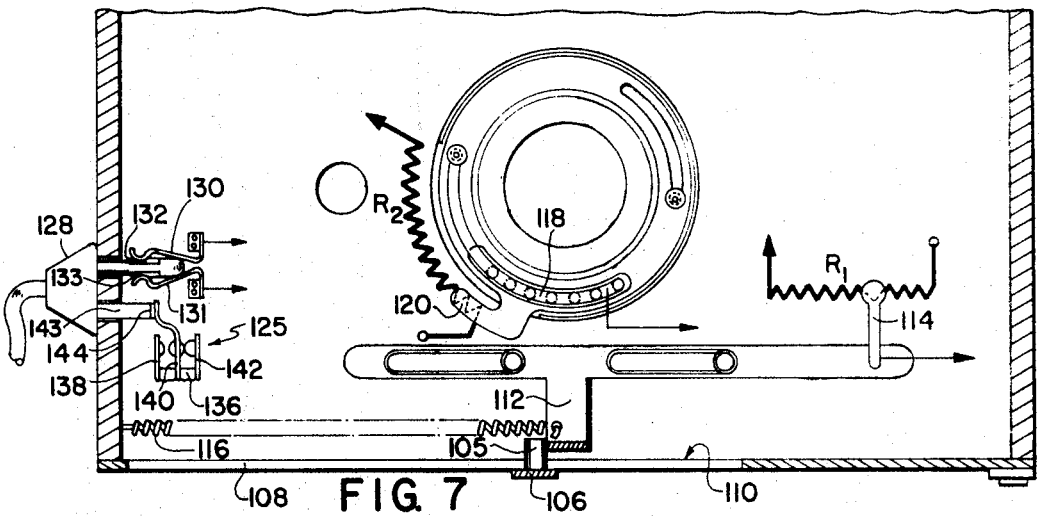
FIG. 7 is a section view taken along lines 7—7 of FIGURE 1.

Many ways may be devised for rendering resistor $R_1$ adjustable in accordance with the focus setting of the objective lens 16 and resistor $R_2$ adjustable in accordance with the setting of the diaphragm blades 56, 58. FIGS. 1, 4 and 7 portray a useful arrangement for accomplishing this end. Referring especially to FIGS. 1 and 4, movement of the focus adjustment member 22 to focus the lens 16 causes a pin 105 on a linkage bar 106, comprising part of focusing linkage 20, to slide in a slot 108 in the bottom wall 110 of the camera front assembly 12. As shown in FIG. 7, the translation of the pin 105 in the slot 108 is utilized to drive a slide member 112 carrying a wiper arm 114 making a sliding electrical connection with the variable resistor $R_1$. With the described arrangement, it is evident that the effective resistance of $R_1$ is rendered a function of the focused distance of lens 16. A spring 116 may be utilized to maintain the slide member 112 in engagement with the pin 105.

In order that the resistance of $R_2$ may be made to vary in accordance with the effective exposure aperture defined by the blades 56, 58, resistor $R_2$ may be arcuate in configuration and disposed in concentricity with the bezel 70. An annular contact member 118 on bezel 70 may have a wiper arm 120 extending radially therefrom for making a sliding electrical connection with the resistor $R_2$. Thus, movement of the lever 68 to adjust the diaphragm blades 56, 58 effects a change in the effective resistance of $R_2$ in the galvanometer circuit.

Resistor $R_1$ may be designed such that the effective resistance per unit length along the locus of travel of the wiper arm 114 increases directly with a predetermined power of the subject distance. The effective resistance or resistor $R_2$ may be made to decrease as a predetermined function of the area of the effective aperture as defined by blades 56, 58. For each value of effective resistance of resistor $R_1$, corresponding to a certain focused distance, there is a predetermined effective resistance value of resistor $R_2$, corresponding to an effective aperture appropriate for the focused distance, which defines, in combination with resistor $R_1$, an effective total resistance in the galvanometer circuit causing the galvanometer pointer 44 to be deflected into registration with the fiducial mark 47.

In order to couple resistors $R_1$ and $R_2$ to the galvanometer and decouple the photoconductive cell 52 therefrom when it is desired to switch from the ambient lighting mode to the flash lighting mode, switching means 125 are provided. FIG. 7 illustrates one way in which such switching may be accomplished. The illustrated switching means 125 is conditioned by the attachment of flashgun 50 to the camera for flash photography purposes. In the illustrated camera the flashgun 50 is connected to synchronization contacts in the shutter apparatus (not shown) through a two-wire cable 126 terminating in a plug 128. Contacts 130, 131 connected in series with the synchronization contacts (not shown) respectively engage terminalse 132, 133 on cable wires (not shown) when the plug 128 is inserted into engagement with the front assembly 12.

The switching means 125 may take the form of a single throw-double pole switch 136 having stacked contact arms 138, 140, 142. A projection 143 may be provided on the plug 128 for engaging an insulator 144 on contact arm 140 normally in engagement with contact arm 138. Engagement of terminal 143 with arm 140 deflects arm 140 into engagement with arm 142 after breaking contact of arm 140 with arm 138. Thus, with such an arrangement, as can be seen from FIG. 6, insertion of the plug 128 into front assembly 12 to connect the flashgun 50 with the shutter synchronization contacts effects a disconnection of the photoconductive cell 52 from the galvanometer circuit 42 and a connection of resistors $R_1$ and $R_2$ therein.

By way of example, with all relevant parameters in the apparatus properly calibrated assume that the predetermined total effective resistance in the galvanometer circuit which will cause the pointer 44 to line up with the fiducial mark 47, is 80 ohms. In operation, in the ambient lighting mode when the diaphragm blades 56, 58 are set to define an effective exposure aperture appropriate for the ambient light level, the sensitivity of the film materials used, and the shutter speed, the photoconductive cell 52, receiving light through the contours 64, 66 in accordance with the setting of blades 56, 58 has an effective resistance of 80 ohms.

In the flash mode of operation wherein insertion of plug 128 into the front assembly 12 switches the photoconductive cell 52 out of the galvanometer circuit and places the resistors $R_1$ and $R_2$ in the galvanometer circuit, the total effective resistance of the combination of resistors $R_1$ and $R_2$ equals 80 ohms when the diaphragm blades 56, 58 define an effective aperture appropriate for the focused distance. For example, if $R_1$ is 60 ohms at a focused distance of 10 feet, $R_2$ at the proper setting of the diaphragm blades to provide a correct exposure should have a resistance of 20 ohms. If, for example, $R_1$ at a focused distance of 3½ feet has an effective resistance of 20 ohms, the effective resistance of $R_2$ should equal 60 ohms when the diaphragm blades 56, 58 are adjusted to define an appropriate effective exposure aperture.

Thus, by this invention, an exposure value determining system has been provided including indicating means producing a unique indication of the selection of an appropriate exposure value in both an ambient lighting mode or a flash lighting mode. In summary, to operate the illustrated system, the user views the scene to be photographed through the viewfinder. The effective aperture defined by diaphragm blades 56, 58 is then varied with lever 68 to bring the galvanometer pointer 44 into alignment with the fiducial mark 47. If the level of ambient illumination is insufficient to produce a satisfactory exposure even at the greatest effective aperture, the resistance of the photoconductive cell 52 remains so high that it prevents a deflection of the pointer 44 above the letters "FL" on mask 33, thus indicating that a proper exposure may be made only with flash illumination. The operator is thus signaled to attach a flashgun to the camera. Upon insertion of the plug 128 into the front assembly 12 to interconnect the flashgun 50 with the synchronization contacts in the shutter apparatus, the photoconductive cell 52 is automatically switched out of circuit with the galvanometer 42 and the combination of resistors $R_1$ and $R_2$ is switched into connection with the galvanometer 42. In the flash lighting mode the operator need not estimate subject distances but need merely focus the camera upon the subject and then adjust the diaphragm blades 56, 58 with the lever 68 until the pointer points to the fiducial mark 47. At this setting of the blades 56, 58 an effective aperture is selected which is appropriate for the intensity of the flash at the selected focused distance.

Figure 8:
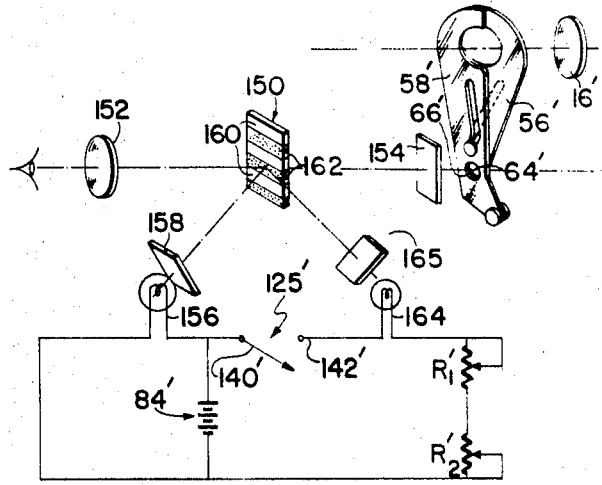
FIG. 8 is a schematic view of another embodiment of the invention.

FIG. 8 reveals another exposure value determining system which may be constructed in accordance with these inventive concepts. These elements in the FIG. 8 system having primed reference numerals may have the same structure and function as the corresponding elements in the embodiment depicted in FIGS. 1–7. This system is adapted for use with a photometer of the comparison type comprising a target 150 arranged to be viewed by a user through an eyepiece 152. A pair of diaphragm blades 56', 58', may be provided with cooperating contours 64', 66' defining an aperture of variable dimensions for controlling the amount of scene light admitted through a diffusing element 154 to a first side of the target 150. A comparison light source, such as a lamp 156, may be arranged to illuminate the second opposed side of the target 150 through a diffusing element 158, serving as a source of reference illumination with which the intensity of the scene light admitted through the diaphragm blades to the target 150 may be compared. The lamp 156 may comprise part of a circuit including a battery 84' and terminals 140', 142' of a single pole-single throw switch 125'.

In the ambient lighting mode of operation with switch 125' as shown in FIG. 8, the diaphragm blades 56', 58' are adjusted, for example, with means as shown in the first-described embodiment, until the scene light admitted through contours 64', 66' and the illumination produced by reference lamp 156 are balanced in intensity on the target 150. The target 150 may have light reflective areas 160 on the side facing lamp 156 and light transmissive areas 162 interlaced with the areas 160 in order that the relative intensities of the scene light and the light from lamp 156 may be visually compared.

In accordance with this invention a circuit may be provided for connection with battery 84' through elements 140', 142' of switch 125', comprising a variable output lamp 164 and variable resistors $R_{1'}$ and $R_{2'}$. Lamp 164 may be arranged to illuminate the target 150 through a diffusing element 166. Resistor $R_{1'}$ may be adapted to be varied in accordance with the setting of the diaphragm blades 56', 58' in the same manner that resistor $R_1$ is coordinated with diaphragm blades 56, 58, in the above-described embodiment. Similarly resistor $R_{2'}$ may be coordinated with the focus setting of focusing means, as in the embodiment described above.

Insertion of a plug 128 in the front assembly 12 effects a closing of switch 125', placing lamp 164 and resistors $R_{1'}$ and $R_{2'}$ in series with the battery 84'. The resistors $R_{1'}$ and $R_{2'}$ may be interrelated as described with respect to the embodiment shown in FIGS. 1-7. The system may be calibrated such that when the total effective resistance of the sum of resistors $R_{1'}$ and $R_{2'}$ equals a predetermined resistance value, the illumination of the first side of target 150 by lamp 164 will balance the intensity of the illumination of target areas 160 produced by the reference lamp 156.

Certain changes may be made in the above apparatus without departing from the scope of the invention herein involved. For example, the resistors $R_1$ and $R_2$ may be connected and interrelated in various other ways than as described above. As a further example, other photometric and indicating devices may be devised by those skilled in the art. It is therefore intended that all matter contained in the above description or shown in the accompanying drawings shall be interpreted as illustrative and not in a limiting sense.

What is claimed is:

1. In a photographic camera for effecting a controlled exposure through an exposure aperture of a photosensitive material within the camera, an exposure value determining system comprising:

an optical system including objective lens means;

adjustable focusing means for selectively moving said lens means to focus the images of photographic subjects at different subject distances upon an image plane containing a photosensitive material;

adjustable means for controlling the selection of various exposure factor values;

photometric means including photoresponsive means exposed to scene light and having an electrical parameter variable in accordance with the intensity of ambient light incident thereon, means for variably attenuating light incident upon said photoresponsive means in accordance with adjustments of said adjustable means and indicating means, said indicating means being responsive to relative levels of ambient brightness and to relative adjustments of said adjustable means for providing, in an ambient lighting mode of operation, a unique indication when an exposure value within a narrow range of appropriate values has been selected with said adjustable means, said indication being dependent upon both said relative levels of ambient brightness and said relative adjustments of said adjustable means;

first resistance means coupled to said focusing means such that the effective resistance thereof is varied in response to adjustments in said focusing means;

second resistance means coupled to said adjustable means such that the effective resistance thereof is varied in response to adjustments in said adjustable means; and means for rendering said indicating means responsive to said first and second resistance means and thereby to the relative adjustments of both said adjustable focusing means and said adjustable means in a flash mode of operation, said first and second resistance means being interrelated such that said indicating means yields said unique indication in the flash mode when an exposure value appropriate for the focused distance, shutter speed and photosensitive material has been selected.

2. The combination defined by claim 1 wherein said adjustable means comprises variable diaphragm means registered with said exposure aperture for defining a range of effective exposure apertures.

3. The combination defined by claim 2 wherein said photometric means comprises a galvanometer, said photoresponsive means being connected in series with said galvanometer and in parallel with said series combination of said first and second resistance means.

4. In a photographic camera for effecting a controlled exposure through an exposure aperture of a photosensitive material within the camera, an exposure value determining system comprising:

an optical system including objective lens means;

adjustable focusing means for selectively moving said lens means to focus the images of photographic subjects at different subject distances upon an image plane containing a photosensitive material;

adjustable means for controlling the selection of various exposure factor values;

photometric means including indicating means responsive to relative levels of ambient brightness and to said adjustable means for providing in an ambient lighting mode of operation a unique indication when an exposure value within a narrow range of appropriate values has been selected with said adjustable means wherein said photometric means comprises a comparison-type photometer and wherein said indicating means comprises a target exposed on a first side to ambient light in an ambient lighting mode of operation, said photometric means including a source of referent illumination arranged to illuminate the opposed second side of said target;

first resistance means coupled to said focusing means such that the effective resistance thereof is varied in response to adjustments in said focusing means;

second resistance means coupled to said adjustable means such that the effective resistance thereof is varied in response to adjustments in said adjustable means; and switching means for rendering said indicating means responsive to said first and second resistance means in a flash mode of operation, said photometric means further including a variable output lamp electrically connectable through said switching means to said resistance means upon conversion to a flash lighting mode of operation for illuminating said first side of said target in accordance with the respective settings of said focusing means and said adjustable means, said first and second resistance means being interrelated such that said indicating means yields said unique indication in the flash mode when an exposure value appropriate for the focused distance, shutter speed and photosensitive material has been selected.

References Cited

UNITED STATES PATENTS 3,163,097 12/1964 Zenyoji et al.
3,344,724 10/1967 Taguchi.
3,368,468 2/1968 Rentschler.

NORTON ANSHER, Primary Examiner

JOSEPH F. PETERS, JR., Assistant Examiner

U.S. Cl. X.R.

95—44, 64